US006975219B2

(12) United States Patent
Eryurek et al.

(10) Patent No.: US 6,975,219 B2
(45) Date of Patent: Dec. 13, 2005

(54) ENHANCED HART DEVICE ALERTS IN A PROCESS CONTROL SYSTEM

(75) Inventors: Evren Eryurek, Minneapolis, MN (US); Jon Dale Westbrock, Eagan, MN (US); Craig Thomas Llewellyn, Bloomington, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 559 days.

(21) Appl. No.: 09/896,967

(22) Filed: Jun. 29, 2001

(65) Prior Publication Data

US 2002/0147511 A1 Oct. 10, 2002

Related U.S. Application Data

(63) Continuation-in-part of application No. 09/861,790, filed on May 21, 2001.

(60) Provisional application No. 60/273,164, filed on Mar. 1, 2001.

(51) Int. Cl.[7] ................................................ G08B 23/00

(52) U.S. Cl. ....................... 340/517; 340/524; 340/525; 340/3.1; 340/825.36; 340/825.49

(58) Field of Search ................................ 340/506, 524, 340/525, 3.1, 825.36, 825.49

(56) References Cited

U.S. PATENT DOCUMENTS

| | | |
|---|---|---|
| 3,705,516 A | 12/1972 | Reis |
| 4,322,976 A | 4/1982 | Sisson et al. |
| 4,408,285 A | 10/1983 | Sisson et al. |
| 4,425,798 A | 1/1984 | Nagai et al. |
| 4,435,770 A | 3/1984 | Shiohata et al. |
| 4,493,042 A | 1/1985 | Shima et al. |
| 4,527,271 A | 7/1985 | Hallee et al. |
| 4,607,325 A | 8/1986 | Horn |

(Continued)

FOREIGN PATENT DOCUMENTS

| | | |
|---|---|---|
| EP | 626 697 A1 | 11/1994 |
| EP | 0959398 | 12/1999 |
| EP | 961 184 A2 | 12/1999 |
| EP | 0 964 325 A1 | 12/1999 |
| EP | 0 965 897 A1 | 12/1999 |
| GB | 2083258 | 3/1982 |
| GB | 23 47 234 A | 8/2000 |
| WO | WO 02/095633 | 11/2002 |
| WO | WO 03/075206 | 9/2003 |

OTHER PUBLICATIONS

U.S. Appl. No. 09/861,790, dated May 21, 2001, "Enhanced Fieldbus Device Alerts in a Process Control System."

U.S. Appl. No. 09/499,445, dated Feb. 7, 2000, "Diagnositcs Expert in a Process Control System."

U.S. Appl. No. 09/257,896, dated Feb. 25, 1999.

U.S. Appl. No. 09/707,580, dated Nov. 17, 2000, "Integrated Alarm Display in a Process Control Network."

U.S. Appl. No. 09/593,327, dated Jun. 14, 2000, "Integrated Optimal Model Predictive Control in a Process Control System."

(Continued)

*Primary Examiner*—Daryl C. Pope

(74) *Attorney, Agent, or Firm*—Marshall, Gerstein & Borun LLP

(57) ABSTRACT

Enhanced HART device alerts enable HART devices within a process control system to report alarm or alert conditions that are detected within the devices to a system user or operator using a plurality of intuitive device status conditions, each of which corresponds to a different level of severity and each of which may require a different type of response by the system user or operator. The status conditions are consistent with enhanced Fieldbus device alerts and include a condition associated with a failure of a HART device, a condition associated with maintenance needed by a HART device and an advisable action in connection with a HART device.

18 Claims, 6 Drawing Sheets

U.S. PATENT DOCUMENTS 4,644,478 A 2/1987 Stephens et al.
4,657,179 A 4/1987 Aggers et al.
4,683,542 A 7/1987 Taniguti
4,734,873 A 3/1988 Malloy et al.
4,763,243 A 8/1988 Barlow et al.
4,764,862 A 8/1988 Barlow et al.
4,885,694 A 12/1989 Pray et al.
4,885,707 A 12/1989 Nichol et al.
4,907,167 A 3/1990 Skeirik
4,910,691 A 3/1990 Skeirik
4,944,035 A 7/1990 Aagardl et al.
4,956,793 A 9/1990 Bonne et al.
4,965,742 A 10/1990 Skeirik
4,980,844 A 12/1990 Demjanenko et al.
5,006,992 A 4/1991 Skeirik
5,008,810 A 4/1991 Kessel et al.
5,015,934 A 5/1991 Holley et al.
5,018,215 A 5/1991 Nasr et al.
5,043,863 A 8/1991 Bristol et al.
5,050,095 A 9/1991 Samad
5,070,458 A 12/1991 Gilmore et al.
5,094,107 A 3/1992 Schoch
5,121,467 A 6/1992 Skeirik
5,134,574 A 7/1992 Beaverstock et al.
5,140,530 A 8/1992 Guha et al.
5,142,612 A 8/1992 Skeirik
5,161,013 A 11/1992 Rylander et al.
5,167,009 A 11/1992 Skeirik
5,187,674 A 2/1993 Bonne
5,193,143 A 3/1993 Kaemmerer et al.
5,197,114 A 3/1993 Skeirik
5,210,704 A 5/1993 Husseiny
5,212,765 A 5/1993 Skeirik
5,224,203 A 6/1993 Skeirik
5,251,151 A 10/1993 Demjanenko et al.
5,282,261 A 1/1994 Skeirik
5,291,190 A 3/1994 Scarola et al.
5,301,101 A 4/1994 MacArthur et al.
5,311,447 A 5/1994 Bonne
5,311,562 A 5/1994 Palusamy et al.
5,325,522 A 6/1994 Vaughn
5,333,298 A 7/1994 Bland et al.
5,351,184 A 9/1994 Lu et al.
5,353,207 A 10/1994 Keeler et al.
5,353,315 A 10/1994 Scarola et al.
5,369,599 A 11/1994 Sadjadi et al.
5,373,452 A 12/1994 Guha
5,384,698 A 1/1995 Jelinek
5,390,326 A 2/1995 Shah
5,396,415 A 3/1995 Konar et al.
5,398,303 A 3/1995 Tanaka
5,400,246 A * 3/1995 Wilson et al. ................ 700/17
5,408,406 A 4/1995 Mathur et al.
5,511,442 A 4/1995 Hernandez
5,442,544 A 8/1995 Jelinek
5,486,920 A 1/1996 Killpatrick et al.
5,486,996 A 1/1996 Samad et al.
5,488,697 A 1/1996 Kaemmerer et al.
5,499,188 A 3/1996 Kline, Jr. et al.
5,521,814 A 5/1996 Teran et al.
5,533,413 A 7/1996 Kobayashi et al.
5,537,310 A 7/1996 Tanake et al.
5,541,833 A 7/1996 Bristol et al.
5,546,301 A 8/1996 Agrawal et al.
5,559,690 A 9/1996 Keeler et al.
5,561,599 A 10/1996 Lu
5,566,065 A 10/1996 Hansen et al.
5,570,282 A 10/1996 Hansen et al.
5,572,420 A 11/1996 Lu
5,574,638 A 11/1996 Lu
5,596,704 A 1/1997 Geddes et al.
5,602,757 A 2/1997 Haseley et al.
5,602,761 A 2/1997 Spoerre et al.
5,610,339 A 3/1997 Haseley et al.
5,631,825 A 5/1997 van Weele et al.
5,640,491 A 6/1997 Bhat et al.
5,640,493 A 6/1997 Skeirik
5,646,350 A 7/1997 Robinson et al.
5,666,297 A 9/1997 Britt et al.
5,680,409 A 10/1997 Qin et al.
5,687,090 A 11/1997 Chen et al.
5,691,895 A 11/1997 Kurtzberg et al.
5,692,158 A 11/1997 Degeneff et al.
5,698,788 A 12/1997 Mol et al.
5,704,011 A 12/1997 Hansen et al.
5,715,158 A 2/1998 Chen
5,729,661 A 3/1998 Keeler et al.
5,740,324 A 4/1998 Mathur et al.
5,742,513 A 4/1998 Bouhenguel et al.
5,754,451 A 5/1998 Williams
5,761,518 A 6/1998 Boehling et al.
5,764,891 A 6/1998 Warrior
5,768,119 A 6/1998 Havekost et al.
5,777,872 A 7/1998 He
5,781,432 A 7/1998 Keeler et al.
5,790,898 A 8/1998 Kishima et al.
5,796,602 A 8/1998 Wellan et al.
5,796,609 A 8/1998 Tao et al.
5,798,939 A 8/1998 Ochoa et al.
5,805,442 A 9/1998 Crater et al.
5,809,490 A 9/1998 Guiver et al.
5,819,050 A 10/1998 Boehling et al.
5,819,232 A 10/1998 Shipman
5,825,645 A 10/1998 Konar et al.
5,826,249 A 10/1998 Skeirik
5,842,189 A 11/1998 Keeler et al.
5,847,952 A 12/1998 Samad
5,855,791 A 1/1999 Hays et al.
5,859,773 A 1/1999 Keeler et al.
5,859,964 A 1/1999 Wang et al.
5,875,420 A 2/1999 Piety et al.
5,877,954 A 3/1999 Klimasauskas et al.
5,892,679 A 4/1999 He
5,892,939 A 4/1999 Call et al.
5,898,869 A 4/1999 Anderson
5,901,058 A 5/1999 Steinman et al.
5,905,989 A 5/1999 Biggs
5,906,214 A 5/1999 Gueret
5,907,701 A 5/1999 Hanson
5,909,370 A 6/1999 Lynch
5,909,541 A 6/1999 Sampson et al.
5,909,586 A 6/1999 Anderson
5,917,840 A 6/1999 Cheney et al.
5,918,233 A 6/1999 La Chance et al.
5,922,963 A 7/1999 Piety et al.
5,924,086 A 7/1999 Mathur et al.
5,940,290 A 8/1999 Dixon
5,948,101 A 9/1999 David et al.
5,949,417 A 9/1999 Calder
5,960,214 A 9/1999 Sharpe, Jr. et al.
5,960,441 A 9/1999 Bland et al.
5,975,737 A 11/1999 Crater et al.
5,984,502 A 11/1999 Calder
5,988,847 A 11/1999 McLaughlin et al.
5,995,916 A 11/1999 Nixon et al.
5,997,167 A 12/1999 Crater et al.
6,008,985 A 12/1999 Lake et al.
6,017,143 A 1/2000 Eryurek et al.
6,026,352 A 2/2000 Burns et al.
6,033,257 A 3/2000 Lake et al.
6,038,486 A 3/2000 Saitoh et al.

| | | | |
|---|---|---|---|
| 6,041,263 | A | 3/2000 | Boston et al. |
| 6,047,221 | A | 4/2000 | Piche et al. |
| 6,055,483 | A | 4/2000 | Lu |
| 6,061,603 | A | 5/2000 | Papadopoulos et al. |
| 6,067,505 | A | 5/2000 | Bonoyer et al. |
| 6,076,124 | A | 6/2000 | Korowitz et al. |
| 6,078,843 | A | 6/2000 | Shavit |
| 6,093,211 | A | 7/2000 | Hamielec et al. |
| 6,106,785 | A | 8/2000 | Havlena et al. |
| 6,108,616 | A | 8/2000 | Borchers et al. |
| 6,110,214 | A | 8/2000 | Klimasaukas |
| 6,122,555 | A | 9/2000 | Lu |
| 6,128,279 | A | 10/2000 | O'Neil et al. |
| 6,144,952 | A | 11/2000 | Keeler et al. |
| 6,169,980 | B1 | 1/2001 | Keeler et al. |
| 6,197,480 | B1 | 3/2001 | Iguchi et al. |
| 6,266,726 | B1 | 7/2001 | Nixon et al. |
| 6,298,377 | B1 | 10/2001 | Hartikainen et al. |
| 6,298,454 | B1 | 10/2001 | Schleiss |
| 6,317,638 | B1 | 11/2001 | Schreder et al. |
| 6,317,701 | B1 | 11/2001 | Pyotsia et al. |
| 6,332,110 | B1 | 12/2001 | Wolfe |
| 6,397,114 | B1 | 5/2002 | Eryurek et al. |
| 6,421,571 | B1 | 7/2002 | Spriggs et al. |
| 6,445,963 | B1 | 9/2002 | Blevins et al. |
| 6,507,797 | B1 | 1/2003 | Kliman et al. |
| 6,525,769 | B1 | 2/2003 | Konar et al. |
| 6,529,780 | B1 | 3/2003 | Soergel et al. |
| 6,549,130 | B1 | 4/2003 | Joao |
| 6,609,040 | B1 | 8/2003 | Brünnemann |
| 6,628,994 | B1 | 9/2003 | Turicchi, Jr. et al. |
| 6,633,782 | B1 | 10/2003 | Schleiss et al. |
| 6,651,012 | B1 | 11/2003 | Bechhoefer et al. |
| 6,690,274 | B1 | 2/2004 | Bristol et al. |
| 6,721,609 | B1 | 4/2004 | Wojsznis et al. |
| 6,738,388 | B1 | 5/2004 | Stevenson et al. |
| 6,774,786 | B1 | 8/2004 | Havekost et al. |
| 2002/0022894 | A1 | 2/2002 | Eryurek et al. |
| 2002/0077711 | A1 | 6/2002 | Nixon et al. |
| 2002/0147511 | A1 | 10/2002 | Eryurek et al. |
| 2002/0161940 | A1 | 10/2002 | Eryurek et al. |
| 2002/0163427 | A1 | 11/2002 | Eryurek et al. |
| 2003/0014500 | A1 | 1/2003 | Shleiss et al. |
| 2003/0028268 | A1 | 2/2003 | Eryurek et al. |
| 2004/0181364 | A1 | 9/2004 | Reeves et al. |

OTHER PUBLICATIONS

"GE Predictor™ Services: GE Predictor Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

Written Opinion for PCT/US02/15901, mailed Jul. 16, 2003.

International Preliminary Examination Report for PCT/US02/15901, issued Sep. 10, 2003.

"Status Signals of Field Instruments," Namur Recommendation, NA 64, Feb. 1, 2001, pp. 1–8.

International Search Report for PCT/US02/16033, dated Jun. 17, 2003.

Written Opinion for PCT/US02/16033, mailed Jul. 21, 2003.

International Preliminary Examination Report for PCT/US02/16033, mailed Sep. 16, 2003.

International Search Report for PCT/US04/004939, issued Sep. 8, 2004.

Written Opinion for PCT/US04/004939, mailed Sep. 29, 2004.

Great Britain Examination Report under Section 18(3) issued Dec. 17, 2003 in Application No. GB0126490.2.

International Preliminary Examination Report for PCt/US02/15901, mailed Sep. 10, 2003.

Great Britain Search Report under Section 17 performed on Dec. 11, 2002 in Application No. GB 0212610.0.

Great Britain Examination Report under Section 18(3) issued on Sep. 16, 2004 in Application No. GB 0212610.0.

Search Report under Section 17 issued by Great Britain Patent Office, dated Jun. 11, 2002 in Application No. GB 012490.2 (UK 2083258).

International Search Report for PCT/US02/06577, dated Nov. 13, 2002.

Wemwe Kalkhoff, "Agent–Oriented Robot Task Transformation," Proceeding of the International Symposium on Intelligent Control. IEEE, pp. 242–247 (Aug. 27, 1995).

* cited by examiner

ENHANCED HART DEVICE ALERTS IN A PROCESS CONTROL SYSTEM

RELATED APPLICATIONS

This application is a continuation-in-part of U.S. patent application Ser. No. 09/861,790, entitled "Enhanced Fieldbus Device Alerts in a Process Control System," filed on May 21, 2001, which claims the benefit of the filing date of U.S. Provisional Patent Application No. 60/273,164, entitled "Asset Utilization Expert in a Process Control Plant," filed on Mar. 1, 2001.

FIELD OF THE INVENTION

The present invention relates generally to process control systems and, more particularly, to the enhancement of HART device alerts or alarms in a process control system.

DESCRIPTION OF THE RELATED ART

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

The DeltaV process control system sold by Fisher Rosemount Systems, Inc. uses function blocks located or installed in controllers or different field devices to perform control operations. The controllers and, in some cases, the field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, such as implementing a proportional-derivative-integral (PID) control routine. The different function blocks within a process control system are configured to communicate with each other (e.g., within a single device or over a bus) to form one or more process control loops, the individual operations of which may be distributed throughout the process control system. Also, as is well known, in addition to function blocks, FOUNDATION Fieldbus (hereinafter Fieldbus) devices may each have one or more associated resource blocks and/or transducer blocks that represent various capabilities of that device. For example, a Fieldbus temperature transmitter having two temperature sensing elements may include two transducer blocks (i.e., one for each sensing element) and a function block that reads the outputs of the two sensing elements (via the transducer blocks) to produce an average temperature value.

Typically, the function, transducer and resource blocks or the devices in which these blocks are implemented are configured to detect errors, faults or problems that occur within the process control loops, the units, the devices, etc. and to send a signal (either automatically, as is the case with Fieldbus devices or in response to polling, as is the case with HART devices) such as an alarm or alert message, to notify an operator at an operator workstation or other user interface that an undesirable condition exists within the process control system or a control loop of the process control system. Such alarms or alerts may indicate, for example, that a block is not communicating, that a block has received or generated an out of range input or output, that a block is undergoing a fault or other undesirable condition, etc. In current alarm processing and display systems, an application executed at, for example, an operator interface/workstation, may be configured to receive messages containing process alarms related to process operation and to display these process alarms in a coherent and manageable manner to thereby enable an operator to manage alarms in some organized or logical way. Such an operator interface system is described in U.S. Pat. No. 5,768,119, entitled "Process Control System Including Alarm Priority Adjustment," which is incorporated by reference herein.

In the past, conventional field devices were used in process control systems to send and receive analog signals, such as, for example, 4–20 milliamp (mA) signals to and from the process controller via an analog bus or analog lines. However, these 4–20 mA signals are limited in nature because they are only indicative of process measurements made by the device or of process control signals generated by the controller required to control the operation of the device during runtime. As a result, conventional 4–20 mA devices are incapable of generating alarms or alerts pertaining to the operational capability or status of the devices. As a result, alarms associated with the condition or status of these devices have generally not been available within process control systems.

More recently, smart field devices including a microprocessor and a memory have become prevalent in the process control industry. A number of open smart device communication protocols such as the Fieldbus, HART®, PROFIBUS®, WORLDFIP®, Device-Net®, and CAN protocols have been developed to enable smart field devices made by different manufacturers to be used together within the same process control network. In addition to performing a primary function within the process, a smart field device may store data pertaining to the device, communicate with the controller and/or other devices in a digital or combined digital and analog format and may perform secondary tasks such as self-calibration, identification, diagnostics, etc. Importantly, the devices conforming to at least some of these protocols (such as the HART and Fieldbus protocols) are capable of detecting problems within the device itself and are capable of generating and sending alarm or alert messages to indicate the detected problems to the appropriate operators, maintenance personnel or engineering personnel responsible for the operation of the process control system.

Fieldbus devices, for example, communicate alarm or alert information using a well known message format. Fieldbus device alarm messages include a block identification field, a relative identification field, a subcode field and a floating point number field. Generally speaking, the fields provided within a Fieldbus device alarm message specify, in increasing levels of particularity, the source of an alarm message and the nature of the alarm or alert conveyed thereby. In particular, the block identification field within a Fieldbus device alarm message identifies the block within the Fieldbus device from which the alarm message originated. Thus, a controller, workstation, etc. may use the block identification field within a Fieldbus device alarm message to determine which block generated the alarm message and whether the alarm message was generated by a function block, resource block or a transducer block.

The relative identification field of a Fieldbus device alarm message identifies what parameter within a particular block (e.g., a function block, resource block, or transducer block) caused the generation of the alarm message. A given block may have two or more parameters associated with it that can be distinguished from each other by using different values within the relative identification field. For example, a function block may have several inputs and outputs, each of which may be uniquely associated with a different relative identification field value.

The subcode field generally provides a numeric value that is indicative of the nature of the alarm message being transmitted by a device and which is predetermined by the device manufacturer. For example, the subcode field may be used to indicate that a sensor reading is outside of a normal operating range, that a sensor has failed completely, or any other failure which can occur within a Fieldbus device.

In Fieldbus devices the subcode field is device and manufacturer specific so that different types of failures within a particular block of a given Fieldbus device may result in different subcode field values and so that identical types of failures within different devices and/or within similar devices made by different manufacturers may also result in different subcode field values being sent within an alarm message. Because the subcode field is not user configurable and because the subcode field values for particular types of failures are device and/or manufacturer specific, manufacturers typically provide a list of subcodes and corresponding failure types so that the subcode values may be translated into failure types.

The floating point field typically contains a floating point number that is associated with the subcode being reported within the alarm message. Thus, in the case where a subcode field indicates that a sensor reading within a particular transducer block is outside of a normal operating range, the floating point field may contain a floating point value representing the actual out of range sensor reading.

As is commonly known, the blocks (i.e., the transducer, resource and function blocks) within Fieldbus devices are capable of providing an alarm notification or reporting parameter BLOCK_ALM and an alarm description or condition parameter BLOCK_ERR. Generally speaking, BLOCK_ALM enables a Fieldbus device to report via a controller and an operator workstation to a system user or operator that an alarm condition exists within that Fieldbus device. Whereas, BLOCK_ERR defines which ones of sixteen different possible alarm or alert conditions have been detected by the Fieldbus device that is reporting an active alarm condition via BLOCK_ALM. As is known, BLOCK_ERR includes sixteen bits, each of which represents one of sixteen predefined possible alarm or alert conditions that can occur in connection with a particular block of a particular Fieldbus device. The sixteen predefined alarm or alert conditions include a device needs maintenance soon condition, a device needs maintenance now condition, an input failure condition, an output failure condition, a memory failure condition, a lost static data condition, an other condition, etc. In addition to the sixteen predetermined detectable alert or alarm conditions, some Fieldbus device manufacturers provide Fieldbus devices that include diagnostics to detect other conditions. For example, a Fieldbus device may detect plugged valve lines or a valve drive failure, may provide a travel alarm, etc. and may report these other types of conditions by setting the "other" bit of the BLOCK_ERR parameter and reporting the other condition via the BLOCK_ALM parameter. Alternatively or additionally, some Fieldbus device manufacturers may report these other types of conditions (i.e., those conditions that are not one of the sixteen predefined conditions) using vendor specific alarms and/or parameters, which may vary widely between device manufacturers.

Unfortunately, the sixteen predefined Fieldbus alarm or alert conditions are grouped together under the BLOCK_ERR parameter and any one active condition (i.e., an alert or alarm condition that has been detected by the device) will cause the BLOCK_ALM parameter to report that the device has an active alarm or alert. Thus, if a first alarm or alert condition becomes active within a traditional Fieldbus device, the BLOCK_ALM parameter reports that first alarm or alert and alarm or alert conditions that become active following that first alarm are not reported until the first reported alarm or alert is cleared or acknowledged. As a result, a relatively low priority alarm or alert condition may mask the reporting of a more serious condition until the system user or operator clears or acknowledges the low priority, first reported condition. By way of example, a block within a Fieldbus device may detect and report a "device needs maintenance soon" condition using the BLOCK_ERR and BLOCK_ALM parameters and if the device subsequently detects "a device needs maintenance now" condition, that subsequently detected condition may be reflected (i.e., by setting the appropriate bit) within the BLOCK_ERR parameter. However, BLOCK_ALM will not be able to report the more serious "device needs maintenance now" condition until the alarm or alert reported in connection with the "device needs maintenance soon" condition is cleared or acknowledged by the system user.

Additionally, the monitoring, processing and reporting of smart field device alarms or alerts in a consistent manner is further complicated when multiple types of smart field devices are integrated within a single process control system. For example, devices conforming to the HART protocol (i.e., HART devices) are often used in conjunction with Fieldbus devices to carry out a process.

In any event, all HART devices are configured (according to the HART protocol) to report device status using eight standard conditions. Unfortunately, the eight standard status conditions defined by the HART protocol and provided by HART compatible devices are typically not consistent with the status conditions provided by Fieldbus compatible devices. As a result, reporting and organizing alarm or alert information being received from combinations of Fieldbus and HART devices to a system operator or user in a consistent manner is very complicated, if not impossible. Furthermore, as is well known, HART devices also typically include one or more non-standard or device specific status conditions that are defined by the device manufacturer. These non-standard status conditions may vary between device types and manufacturers so that a particular type of device produced by different manufacturers or different types of devices produced by a single manufacturer may provide different sets of device specific status conditions. In any case, these non-standard HART device status conditions further complicate the integrated monitoring, processing and display of HART device status and Fieldbus device status.

SUMMARY OF THE INVENTION

The enhanced HART device alerts described herein enable HART devices within a process control system to report alarm or alert conditions that are detected within the devices to a system user or operator using a plurality of status conditions that are consistent with the types of alarms reported by Fieldbus devices, particularly Fieldbus devices that use the enhanced Fieldbus device alerts described herein. Each of these status conditions corresponds to a different level of severity and each type of status condition may require a different type of response by the system user or operator.

In accordance with one aspect of the invention, a method of generating a HART alert message within a process control system includes the steps of uniquely associating a plurality of device conditions for a HART device with a plurality of device status conditions each of which is indicative of a different level of severity. The method may further include the steps of detecting a condition associated with the HART device and mapping the condition associated with the HART device to one of the plurality of device status conditions. Additionally, the method may includes the step of generating the HART alert message to include information associated with the condition associated with the HART device and the one of the plurality of device status conditions.

In accordance with another aspect of the invention, a method of reporting field device alert messages within a process control system having a user interface display includes the steps of detecting a condition within a field device and associating the detected condition with one of a device failure, device maintenance and advisable action status conditions, each of which is indicative of a different level of severity. The method may further include the step of reporting the detected condition via the user interface display using the one of the device failure, device maintenance and advisable action status conditions.

DESCRIPTION OF THE PREFERRED EMBODIMENTS

Figure 1:
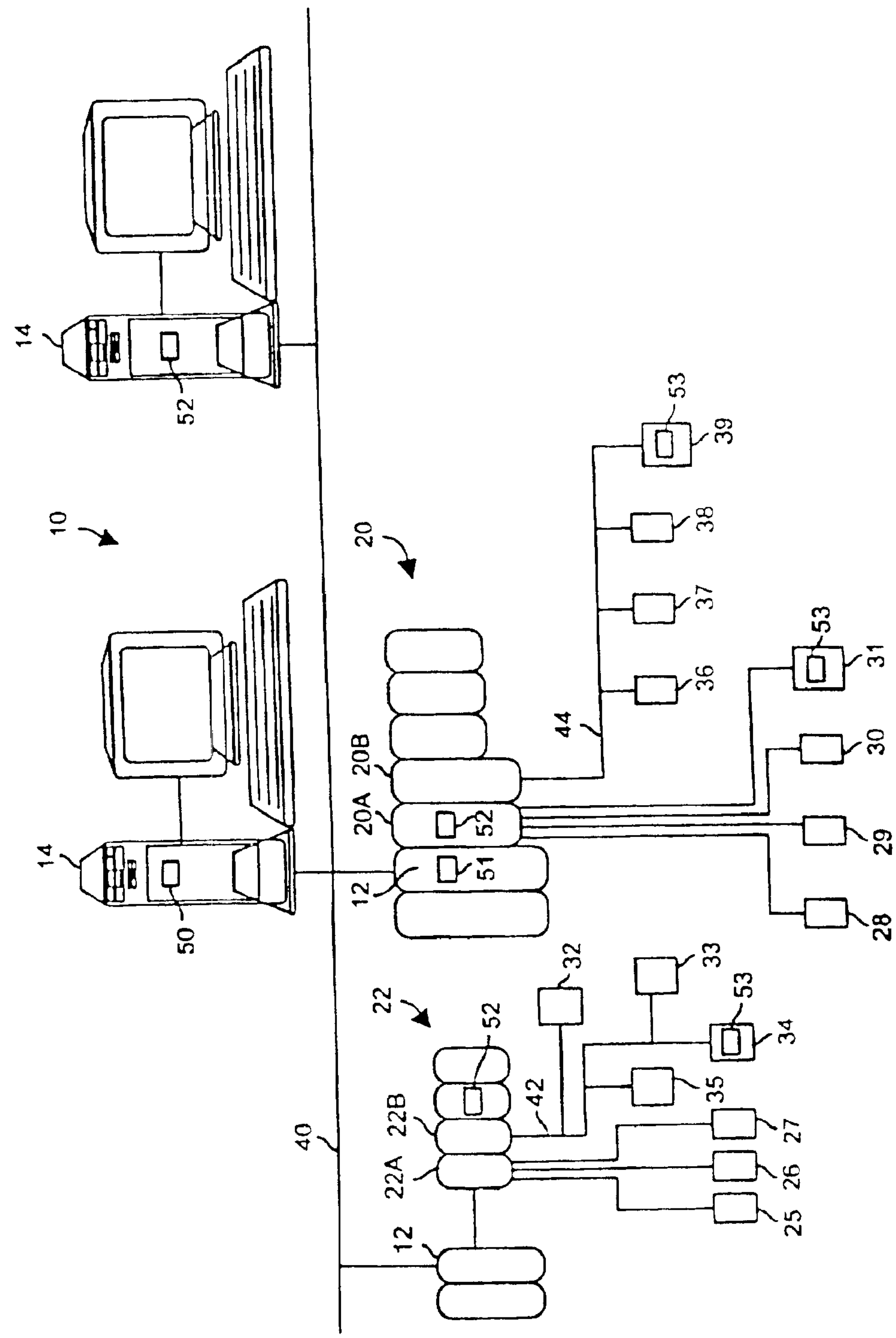
FIG. 1 is a block diagram of a process control system in which Fieldbus devices and HART devices having enhanced alert or alarm capability may be used.

Referring now to FIG. 1, a process control network or system 10 includes one or more process controllers 12 connected to one or more host workstations or computers 14 (which may be any type of personal computer or workstation) and banks of input/output (I/O) devices 20, 22, each of which is connected to one or more field devices 25–39. The controllers 12 may be, for example, DeltaV™ controllers sold by Fisher-Rosemount Systems, Inc., and are communicatively connected to the host computers 14 via, for example, an Ethernet connection 40 or any other suitable communication link. Likewise, the controllers 12 are communicatively connected to the field devices 25–39 using any desired hardware and software associated with, for example, standard 4–20 mA devices and/or any smart communication protocol such as the Fieldbus or HART protocols. As is generally known, the controllers 12 implement or supervise process control routines stored therein or otherwise associated therewith and communicate with the field devices 25–39 to control a process in any desired manner.

The field devices 25–39 may be any types of devices, such as sensors, valves, transmitters, positioners, etc., while the I/O cards within the banks 20 and 22 may be any types of I/O devices conforming to any desired communication or controller protocol such as HART, Fieldbus, Profibus, etc. In the embodiment illustrated in FIG. 1, the field devices 25–27 are standard 4–20 mA devices that communicate over analog lines to the I/O card 22A, the field devices 28–31 are illustrated as HART devices connected to a HART compatible I/O device 20A, and the field devices 32–39 are Fieldbus field devices, that communicate over a digital bus 42 or 44 to the I/O cards 20B or 22B using Fieldbus protocol communications.

Each of the controllers 12 is configured to implement a control strategy using function, transducer and resource blocks. As is well known, each block is a part (e.g., a subroutine) of an overall control routine and operates in conjunction with other blocks (via communications called links) to implement process control loops within the process control system 10. Function blocks and transducer blocks typically perform input functions, such as those associated with a sensor or other process parameter measurement device, control functions, such as those associated with a control routine that performs PID control, fuzzy logic control, etc., or output functions that control the operation of some device, such as a valve, to perform some physical function within the process control system 10. Of course, hybrid and other types of blocks exist.

Function blocks may be stored in and executed by the controller 12, which is typically the case when function blocks are used for, or are associated with, standard 4–20 mA devices and some types of smart field devices, or may be stored in and implemented by the field devices. While the description of the control system 10 is provided herein using a function, transducer and resource block control strategy, the control strategy could also be implemented using other techniques, such as ladder logic, sequential flow charts, etc. and using any desired proprietary or non-proprietary programming language.

Figure 3:
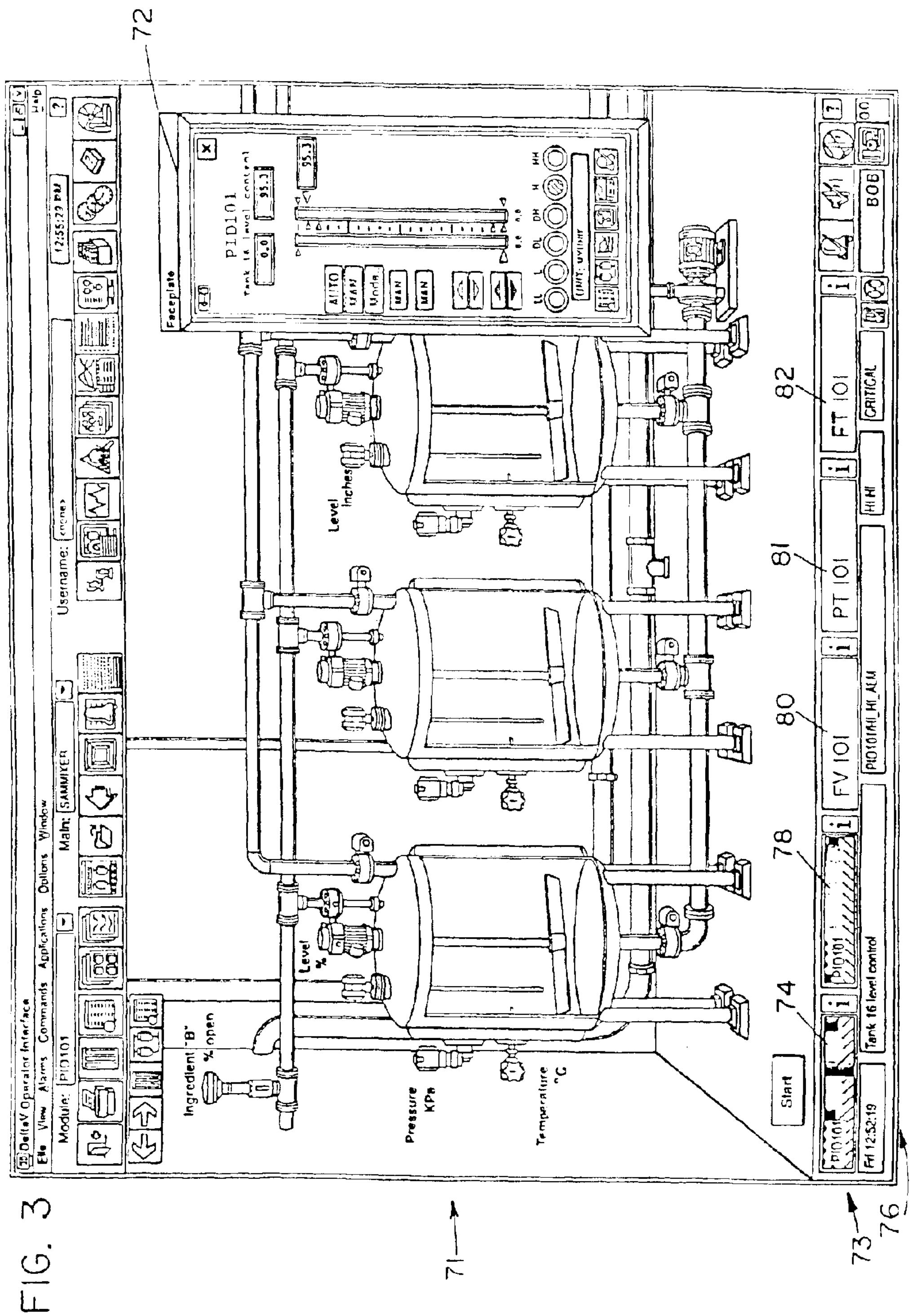
FIG. 3 is an exemplary user interface screen that may be generated by the alarm display and interface system used in the process control system of FIG. 1.

In the system of FIG. 1, one or more of the host devices 14 functions as an operator workstation and has alarm processing software 50 stored therein. Generally speaking, the alarm processing software 50 displays information about the process control system 10 pertinent to the system operator's or user's understanding or ability to view the current operational status of the process with respect to the alarms present in the system. For example, the alarm processing software 50 may display an alarm banner having alarm indications therein and a primary control display illustrating a section of the process control system 10, including the devices and other equipment associated with that section of the process control system 10 relevant to one or more of the alarms being displayed within the alarm banner. The primary control display may provide information about the current state of the process control system 10, such as the level of a fluid in a tank, the flow characteristic of a valve and other fluid lines, the settings of equipment, the readings of sensors, the status of a device, etc. An example of such a display is illustrated in FIG. 3. An operator may use the alarm processing software 50 to view different parts of the process control system 10 or equipment within the process control system 10. Of course, the alarm processing software 50 communicates with the controllers 12 and, if necessary, the field devices 25–39, any of the banks of I/O devices 20, 22 or any other devices to obtain the relevant values, settings and measurements associated with or being made in the process control system 10 to create the interface screen on the operator display of the workstation 14.

The alarm processing software 50 is configured to receive alarm messages created by alarm generating software within some or all of the controllers 12, the I/O devices 20 and 22 and/or the field devices 25–39. This alarm processing software 50 is generally illustrated, by way of example only, as software elements 51, 52 and 53 in FIG. 1. Generally speaking, the alarm processing software 50 receives different categories of alarm messages including, for example, process alarms (which are typically generated by process control software modules, such as those made up of communicatively interconnected function blocks, forming process control routines used during runtime of the process), hardware alarms, such as alarms generated by the controllers 12, I/O devices 20 and 22 or other workstations 14, pertaining to the state or functioning condition of these devices, and device alarms, which are generated by some or all of the field devices 25–39 to indicate problems or potential problems associated with those devices. These or other categories of alarms may be generated in any desired manner. For example, it is well known to have the function blocks or software modules that are used to implement process control functions generate process alarms, and these process alarms are typically sent in the form of alarm messages to operator interfaces for display. Also, some smart devices, controllers, I/O devices, databases, servers, workstations, etc. may use any desired proprietary or non-proprietary software to detect problems, errors, maintenance alerts, etc. and may send alarms or alerts indicating these conditions to the operator interface within the workstation 14. In particular, many devices, such as controllers, I/O devices and smart field devices are provided with software and/or sensors that detect hardware problems, such as a stuck valve plug, broken parts, maintenance concerns, etc. and may generate signals or messages indicting these conditions.

If desired, the alarm processing software 50 may receive and filter alarms based on a number of factors. In particular, the alarm processing software 50 may filter alarms based on the workstation in which the software 50 is executed, the identity of the person logged into the workstation, and operator configurable settings, such as category, type, priority, status, time of generation, etc. of the alarm. For example, the alarm processing software 50 may filter alarms to selectively display alarms from the areas or sections of the plants that the workstation executing the alarm processing software 50 is configured to receive. In other words, alarms for certain areas or sections of the plant may not be displayed at particular workstations but, instead, each workstation may be limited to displaying alarms for one or more specific areas of the plant. Likewise, alarms may be filtered based on operator identification so that individual operators may be limited to viewing certain categories, types, priority levels, etc. of alarms or may be limited to viewing alarms from a section or subsection (e.g., an area) of the plant. The alarm processing software 50 may also filter alarms for display based on the operator's security clearance. In general, these workstation and operator filtering settings are referred to herein as workstation and operator scope controls.

The alarm processing software 50 may also filter the viewable alarms (i.e., those within the workstation and operator scope controls) based on operator configurable settings including, for example, the alarm category (e.g., process, device or hardware alarm), alarm type (e.g., communication, failure, advisory, maintenance, etc.), the alarm priority, the module, device, hardware, node or area to which the alarm pertains, whether the alarm has been acknowledged or suppressed, whether the alarm is active, etc.

Some or all of the Fieldbus devices 32–39 may include three independently reportable device alarm or alert categories that have not previously been used in connection with Fieldbus devices. Generally speaking, each of these independently reportable alarm categories may correspond to a different level of severity and, thus, alarms or alerts within each category may require a different type of response by the system user or operator.

In particular, the Fieldbus devices 32–39 may provide an alarm parameter FAILED_ALM which is generally indicative of a problem within a device that has ceased to operate properly or which may not be operating at all, thereby preventing the device from performing its normal sensing and/or control functions. For example, a memory failure within a device, a drive failure within a device, or any other device failure that may require immediate attention (i.e., maintenance, repair, etc.) may be reported using the FAILED_ALM parameter. The Fieldbus devices 32–39 may also provide an alarm parameter MAINT_ALM, which is generally indicative of a condition detected within a device that is associated with a requirement for some type of device maintenance, but which is not severe enough to merit reporting via the FAILED_ALM parameter. Device conditions reported using the MAINT_ALM parameter are preferably, but not necessarily, conditions that result from some type of degradation, wear, fatigue, etc. within a device that could ultimately result in failure of the device, but which do not necessarily affect the ability of the device to sense, to control or to perform any other needed function. For example, sticking valves, impulse lines that are becoming plugged, etc. are device conditions that may result in the reporting of an alarm or alert via the MAINT_ALM parameter. Additionally, the Fieldbus devices 32–39 may provide an alarm parameter ADVISE_ALM, which is generally indicative of a condition detected within a device that only merits an alert or alarm of an advisory nature. Generally speaking, alarms or alerts that are reported using the ADVISE_ALM parameter do not have any impact on the operation of the device or the process being controlled and/or monitored using the device. For example, a grounding problem detected by a magmeter, a transient over temperature or a transient over pressure detected by a sensor may be reported using the ADVISE_ALM parameter.

Thus, in contrast to the BLOCK_ALM and BLOCK_ERR parameters used by traditional Fieldbus devices, the independently reportable FAILED_ALM, MAINT_ALM and ADVISE_ALM parameters described herein enable a Fieldbus device to simultaneously report multiple alarms or alerts having different levels of severity. In other words, a single Fieldbus device can, using the independently reportable alarms described herein, report a grounding problem, which does not require any immediate attention, using the ADVISE_ALM and at the same time that Fieldbus device can report a more severe condition such as, for example, a sensor failure that requires immediate attention using the FAILED_ALM parameter, regardless of whether the FAILED_ALM has been acknowledged or cleared by the system operator.

Preferably, but not necessarily, each of the FAILED_ALM, MAINT_ALM and ADVISE_ALM parameters described herein are formed using a thirty-two bit word based on any desirable data format or type such as, for example, DS-72 or DS-71, which are both well known IEEE standards and, thus, will not be described further herein. Each bit within each thirty-two bit word may be representative of a unique device condition to be reported using the alarm parameter corresponding to that thirty-two bit word. Thus, thirty-two device conditions at each of the three different levels of severity (i.e., FAILED_ALM, MAINT_ALM and ADVISE_ALM) for a total of ninety-six unique alarm or alert conditions may be reported by each Fieldbus device. If desired, one bit within each of the independently reportable alarms FAILED_ALM, MAINT_ALM and ADVISE_ALM may be used for "other" conditions that are not specifically defined, thereby enabling the devices to more flexibly provide for the detection of a variety of device conditions which may not be anticipated during the design of the device and/or which may be needed by a particular user.

While, in general, a lower severity alarm or alert may be reported using the ADVISE_ALM or MAINT_ALM parameters without affecting the ability of a Fieldbus device to simultaneously report a higher severity alarm using the FAILED_ALM parameter, multiple active conditions (i.e., multiple detected device conditions) within a particular alarm parameter may not result in multiple alarm events being sent to the operator workstation 14. For example, if one of the Fieldbus devices detects an over pressure condition and an over temperature condition, the bits corresponding to these conditions will be set within the ADVISE_ALM parameter for that device. However, the first detected condition will cause an alarm event to be generated and sent to the operator workstation 14, while any subsequently detected condition will cause another alarm event to be generated and sent to the workstation only after the alarm event associated with the earlier or first detected condition is cleared or acknowledged by the system operator or user. As a result, if the Fieldbus device detects the over pressure condition first, the subsequently detected over temperature condition will not generate an alarm event until the system user or operator clears or acknowledges the over pressure alarm or alert.

The FAILED_ALM, MAINT_ALM and ADVISE_ALM parameters may be independently reported to the system user or operator via one of the workstations 14 using the Fieldbus alarm message format described above (i.e., the message format including a block identification field, a subcode field, etc.). Further, each of the thirty-two possible conditions associated with each of the FAILED_ALM, MAINT_ALM and ADVISE_ALM parameters is preferably, but not necessarily, represented using a unique subcode when these alarms are sent to a system workstation using the Fieldbus alarm messaging format. Each Fieldbus device includes definitions of the subcodes associated with each of the possible conditions for each of the FAILED_ALM, MAINT_ALM and ADVISE_ALM parameters. Also, each Fieldbus device may define a unique textual message that is descriptive of the condition associated with each of the subcodes. Although each subcode preferably corresponds to a unique device condition and, thus, a unique textual message, it may be desirable in some situations to use a single textual message for more than one device condition.

The independently reportable device alarm parameters described herein may be filtered by each device to enable or to disable the reporting of an alarm or alert in response to one or more the possible device conditions (i.e., the ninety-six possible conditions). Each of the Fieldbus devices 32–39 that are capable of reporting alarms using the independently reportable FAILED_ALM, MAINT_ALM and ADVISE_ALM parameters described herein may further include an active alarm parameter and a mask parameter for each of the independently reportable alarm parameters. In particular, each of the Fieldbus devices 32–39 may include FAILED_ACTIVE and FAILED_MASK parameters, which correspond to the reportable FAILED_ALM parameter, MAINT_ACTIVE and MAINT_MASK parameters, which correspond to the reportable MAINT_ALM parameter, and ADVISE_ACTIVE and ADVISE_MASK parameters, which correspond to the reportable ADVISE_ALM parameter. The mask and active parameters are preferably, but not necessarily, implemented using an unsigned thirty-two bit data format or type. Of course, any other suitable data type or format may be used instead.

Each of the thirty-two bits in the mask and active parameters uniquely corresponds to a condition within its corresponding reportable alarm parameter (i.e., FAILED_ALM, MAINT_ALM and ADVISE_ALM). In general, the bits of the mask parameters of each device may be set or reset during configuration, for example, to enable or to disable the ability of a device to report alarms in response to the detection of conditions associated with the FAILED_ALM, MAINT_ALM and ADVISE_ALM parameters or alarms for that device. In this manner, a system user or operator may selectively enable or disable those conditions for which each device will generate a Fieldbus alert or alarm message. Of course, a system user or operator may enable or disable as many or few device conditions as desired.

In operation, when a Fieldbus device detects a condition, a bit corresponding to that detected condition may be set within an appropriate active parameter. For example, if a Fieldbus device detects a failed sensor, a bit corresponding to that condition within the FAILED_ACTIVE parameter for a transducer block within that device may be set or reset to indicate the sensor failure. Any additional device conditions that are detected (and which have not been acknowledged, canceled or cleared), or which are detected at any time, may also result in bits being set or reset within the active parameter to indicate the existence of those additional conditions. However, as discussed in greater detail below, conditions which are detected following a reported condition (i.e., one for which a Fieldbus alarm message has been sent to the system operator) that has not yet been acknowledged may not be reported until that reported condition has been acknowledged, canceled or otherwise cleared by the system user or operator. The Fieldbus device may then use the FAILED_MASK parameter for the transducer block to filter the device conditions associated with that block for which the user or system operator does not want to receive alarms or alerts. The system user or operator may, at the time of system configuration, define which bits are set or reset in the FAILED_MASK parameter to achieve the desired filtering. By way of example, a logical AND operation may be performed with the FAILED_MASK parameter and the FAILED_ACTIVE parameter to generate the FAILED_ALM parameter to have bits that have been set or reset to indicate the presence of device conditions that are currently active (i.e., have been detected) and which have not been masked by the mask parameter.

In general, each of the independently reportable alarm parameters FAILED_ALM, MAINT_ALM and ADVISE_ALM may report or cause a Fieldbus device to send Fieldbus alarm or alert messages to the system user or operator (for any detected conditions that are active and which are not masked) in the order in which the conditions are detected. In other words, detected conditions within a particular one of the independently reportable alarm parameters for a particular device may be reported to the system user or operator in the order in which the conditions were detected (i.e., on a first in first out basis). Of course, detected conditions may be reported to the system user or operator using some other prioritization or sequencing mechanism if desired. For example, non-masked detected conditions may be reported in reverse chronological order (i.e., on a last in first out basis), based on the type of the condition detected, etc. Additionally, a Fieldbus device may provide a clear alarm message when all the alarm messages associated with a particular alarm parameter are cleared. Furthermore, if a mask parameter for a particular alarm is changed while a condition associated with the alarm parameter is active, the device may clear the alarm and reevaluate the alarm based on any changes that have been made to the mask parameter.

Each of the Fieldbus devices 32–39 may also include priority parameters FAILED_PRI, MAINT_PRI, and ADVISE_PRI for each of its respective FAILED_ALM, MAINT_ALM and ADVISE_ALM parameters. These priority parameters may be implemented using unsigned eight bit values, which provides 256 possible priority levels, and may, for example, be assigned a default level or value of two. Setting the priority level of an alarm to zero disables the reporting of that alarm and setting the priority level to any value between 1 and 255 enables a user or system operator to control the manner in which the alarm processing software 50 manages alarms or alerts on a system-wide basis. In particular, the numerous possible priority levels may be used to determine which devices alarms or alerts take precedence over the alarms or alerts of other devices. In this manner, the system user or operator can predefine how the system manages and processes a potentially large number of active alarms.

Each of the Fieldbus devices 32–39 may also include a RECOMMENDED_ACTION parameter that may be mapped to textual information within the device description information, which may be stored within the workstation 14. The textual information referenced by the RECOMMENDED_ACTION parameter may be displayed to the system operator or user to assist in the correction, repair, etc. of a device that has generated an alarm. In the case where a reported alarm has multiple active conditions, the recommended action displayed to the system user or operator may be the most critical or highest priority condition.

As described above, the various types of alerts and alarms generated by the Fieldbus devices 32–39 may be mapped at the device level to a plurality of independently reportable alarm parameters (e.g., FAILED_ALM, MAINT_ALM and ADVISE_ALM). In this manner, alerts or alarms from a plurality of Fieldbus devices can be monitored, processed and displayed in a consistent, logical manner to a system operator or user via the workstation 14. Additionally, within a given Fieldbus device, the independent nature of independently reportable alarm parameters described herein prevents lower severity types of alerts from masking the communication or display of higher severity types of alerts or alarms to the system operator or user.

Although the HART devices 28–31 each provides eight standard status conditions and possibly one or more device specific status conditions. However, these standard and device specific status conditions are not consistent with the status conditions being reported by the Fieldbus devices 32–39. In particular, the HART devices 28–31 do not report status conditions in a manner that is consistent with the independently reportable alarm parameters FAILED_ALM, MAINT_ALM and ADVISE_ALM described herein.

To facilitate the integrated monitoring, processing and display of alerts or alarms associated with the status conditions being reported by the HART devices 28–31 and the alerts or alarms being reported by the Fieldbus devices 32–39 via the independently reportable alarms parameters described herein, the alarm processing software 50 maps or categorizes HART compliant status information to alert or alarm categories that are consistent with the independently reportable alarm parameters FAILED_ALM, MAINT_ALM and ADVISE_ALM. By way of example only, the eight standard HART device status conditions may be mapped as indicated by Table I below.

TABLE 1

| HART Status Condition | Mapped Reporting Category |
|---|---|
| Device Malfunction | FAILED |
| More Status Available | ADVISORY |
| Configuration Change | ADVISORY |
| PV Saturated | MAINTENANCE |
| PV Fixed | MAINTENANCE |
| PV Out of Limits | MAINTENANCE |
| Non-PV Out of Limits | MAINTENANCE |
| Cold Start | ADVISORY |

Thus, as depicted in Table I above, the alarm processing software 50 maps or categorizes the eight standard HART device status conditions into FAILED, MAINTENANCE and ADVISORY categories, thereby enabling these standard HART status conditions to be reported or displayed to the system operator or user along with Fieldbus device alerts or alarm information in a more consistent and logical manner than was possible with prior systems.

As is well known, in contrast to Fieldbus devices, HART devices must be polled to obtain current device status conditions. Accordingly, the alarm processing software 50, the controllers 12 and/or the I/O device 20A may be configured to periodically poll the HART devices 28–31 for status information. Because every response message sent by a HART device includes the current states of the eight standard status conditions, the alarm processing software 50 may efficiently obtain this status information by extracting the status information from responses to commands that are typically sent by the controllers 12 via the I/O device 20A to the HART devices 28–31. In other words, the alarm processing software 50 may introduce little or no additional communication overhead by obtaining status information from responses to commands that would otherwise be periodically sent to the HART devices 28–31 by the controllers 12 to carry out required process control or monitoring activities. For example, in the case where the controllers 12 are DeltaV type controllers, HART commands #0 and #3 are periodically sent to the HART devices 28–31. Thus, the alarm processing software 50 may extract standard HART status condition information associated with the devices 28–31 from the messages sent in response to these commands. Of course, if desired, any other command could be used by the controllers 12 and the alarm processing software 50 to cause the HART devices 28–31 to send responsive messages containing the standard HART status information.

As is well known, non-standard HART status (i.e., device specific status) conditions may be obtained by sending a HART command #48 to the HART devices 28–31. As is also well known, the HART communication protocol specifies that device specific status information may be available when either the "Device Malfunction" or the "More Status Available" conditions are true (i.e., the bits are set to a logical 1). Thus, when the alarm processing software 50 detects a true condition for either the "Device Malfunction" or the "More Status Available" status conditions for one of the HART devices 28–31, the alarm processing software 50 sends a HART command #48 to that device. In response to the command #48, the polled device provides more detailed information relating to the nature of the device specific condition or status. The alarm processing software 50 may then categorize any device specific status conditions, which are provided in response to a command #48, in the following manner: (1) if the "Device Malfunction" bit has been set, the alarm processing software 50 maps the device specific status condition to the "FAILED" alert or alarm category and (2) if the "More Status Available" bit has been set, the alarm processing software 50 maps the device specific status condition to the "ADVISORY" alert or alarm category.

Figure 2:
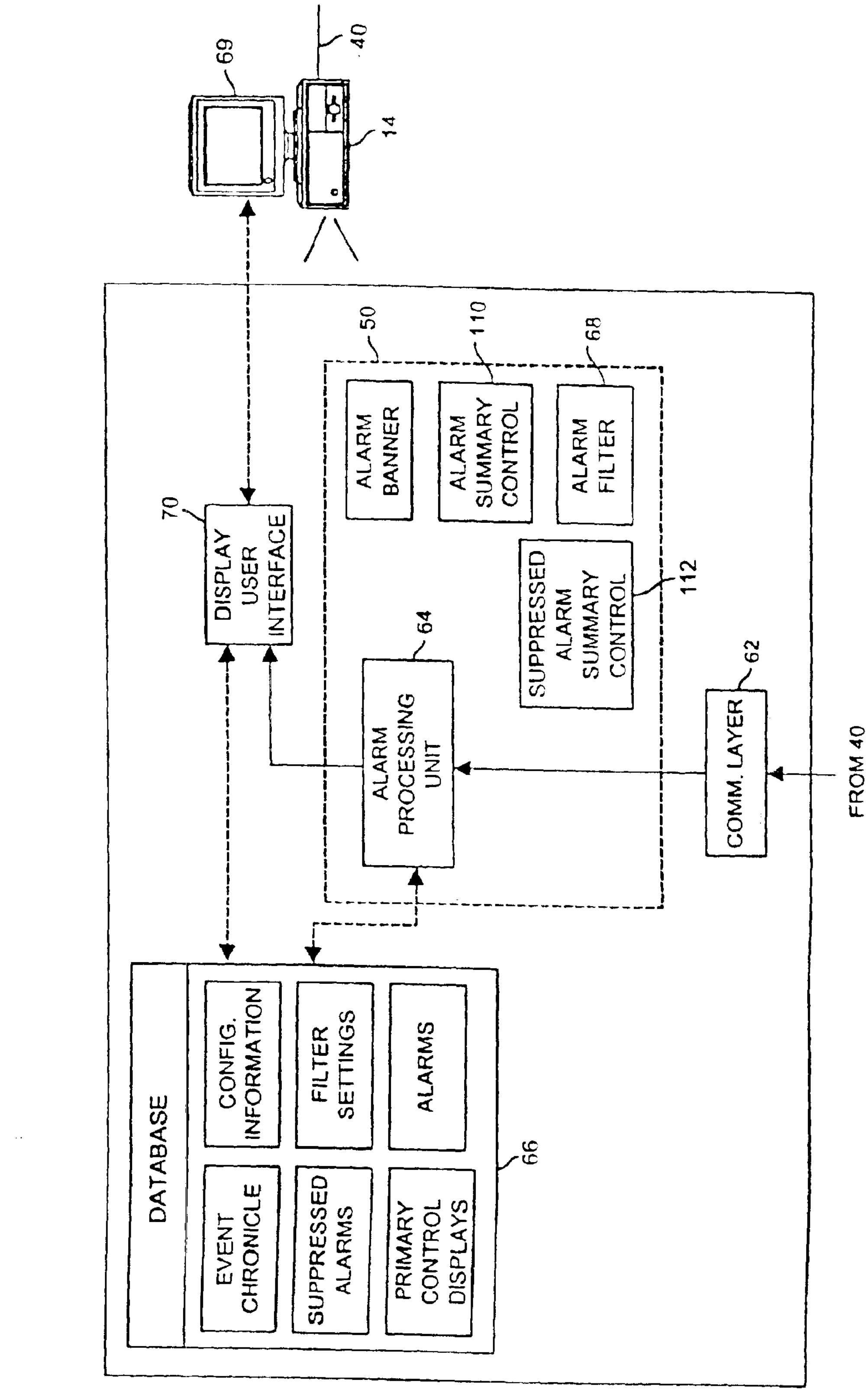
FIG. 2 is a block diagram of a workstation having an alarm display and interface system executed therein that may be used in the process control system shown in FIG. 1.

Referring now to FIG. 2, the configuration of one of the workstations 14 that implements the alarm display and interface system is illustrated in more detail. As illustrated in FIG. 2, the workstation 14 stores and executes communication software, such as a communication layer or stack 62, that communicates with the controllers 12 via the Ethernet connection 40 to receive signals sent by the controllers 12, I/O devices within the banks 20 and 22, the field devices 25–39 and/or other workstations. The communication layer 62 also properly formats messages to be sent to the controllers, I/O devices, the field devices 25–39 and other workstations such as alarm acknowledgment messages or signals, etc. The communication software used to implement the communication layer can be any known or desired communication software that is currently used with, for example, Ethernet communications. Of course, the communication stack 62 is coupled to other software that performs other functions, such as configuration applications, diagnostic or other process applications, database management applications, etc. executed within the workstation 14.

The alarm display and interface system includes an alarm processing unit 64 that receives alarms and other event information from the communication layer 62 in the form of messages, decodes those messages containing alarm or other event information and may store the alarm and other event information in a database 66. The front end of the alarm processing unit 64, which interfaces with the communication layer 62 and the database 66, may be an alarm receiver. The alarm processing software 50 also includes an alarm filter 68 that the alarm processing unit 64 uses to determine which alarms are to be displayed on a user interface 69 (such as a CRT, LCD, LED, plasma display, printer, etc.) associated with the workstation 14. The filter 68 may have its settings stored in the database 66 and these filter settings may be preconfigured and/or may be changed by a user based on the user's preferences. It should be recognized that the filter 68 and its settings are distinct from the device level mask parameters FAILED_MASK, MAINT_MASK and ADVISE_MASK, which may be used in connection with Fieldbus devices as described herein. That is, a system user or operator may filter specific alarms generated by specific conditions within specific devices using the device mask parameters. Alternatively or additionally, as described herein, the system user or operator may filter types or categories of alarms, alarms associated with particular plants, areas, units, loops, etc. within the process control system using the filter 68. For example, in the case where the alarm processing software 50 is processing alert or alarm information being sent by one or more of the HART devices 28–31, the alarm filter 68 may be used to selectively display alert or alarm information in any desired manner. Of course, the HART devices 28–31 do not have internal alarm or alert filtering mechanisms such as, for example, the device level mask parameters described above in connection with the Fieldbus devices 32–39.

Generally, the filter settings of the alarm filter 68 may control the category and priority of alarms and, if desired, may establish the order of the alarms to be displayed using a number of different criteria. The workstation and operator scope controls affect what a particular operator can see (e.g., which alarms can be displayed at a particular workstation) based on the operator identification and workstation to which the operator is logged on. In this case, an operations license may be assigned to each workstation and, without an operations license, the alarm information and all alarm list/summary displays may be empty. In other words, no active or suppressed alarms of any category (i.e., process, hardware or device) will be shown by the alarm processing unit 64. Still further, only alarms from a plant area in the current operator's scope (the operator is usually given at least one security key in the plant area) are eligible to appear in the alarm displays on that workstation. Also, only alarms from a plant area and unit which has not been turned off using the plant area or unit filtering display(s) (to be discussed below) are eligible to appear in the alarm display. In this manner, the filter 68 prevents the display of alarms outside of the workstation and operator scope and alarms from plant areas or units that have been turned off by the operator.

After testing alarms for conformance to the workstation and operator scope controls, the filter 68 filters out and determines the display order of alarms based on operator settings, which may include, for example, the category of alarm, the priority of the alarm, the type of alarm, the acknowledged status of the alarm, the suppressed status of the alarm, the time of the alarm, the active status of the alarm, etc. The received alarms, which are sent to the alarm processing software 50 using alarm messages (e.g., Fieldbus alarm messages) may include a parameter for each of these values and the filter 68 may filter alarms for display by comparing the appropriate parameters of the alarms to the filter settings. For example, the operator can indicate which categories of alarms and priority levels of alarm should be displayed on the screen. If desired, the operator can adjust a predetermined priority level for an alarm by offsetting the priority level from the preconfigured priority level for the alarm set by the manufacturer. In the DeltaV system, a priority level between about three and fifteen is selected for each alarm and the operator can offset this priority level by any number of levels to make a higher priority a lower priority or a lower priority a higher priority when viewed by the filter 68. While the operator may set the order of display of the alarms that are passed by the filter 68, the order may also be determined by preconfigured settings to provide a consistent display of different types of alarms.

In any event, the operator can customize the manner in which alarms are displayed based on the categories or types of alarms that the user is most interested in, which may all be one category or type of alarm such as process alarms, device alarms, hardware alarms or any combination of two or more categories of alarms. Further, the user may configure the display of alarms so that alarms or alerts of different severities may or may not be displayed. For example, the user may want to view only alarms or alerts contained within FAILED_ALM and MAINT_ALM parameters and may not want to view alarms or alerts contained within ADVISE-ALM parameters. More generally, the system operator or user may configure the display of alarms to view alerts or alarms associated with a device failure, a device needing maintenance, and/or an advisory action in connection with a device. The user may also have control over how the alarms are presented and the information provided with the alarms. In this manner, the alarm processing software 50 enables a single person to perform the operations of an operator, a technician or maintenance person and an engineer by viewing and addressing on the same screen the alarms that would normally be addressed by different personnel at different locations in a plant. Alternatively, at different times in the same system a maintenance person can use the same system to view only maintenance alarms while an engineer can view other types of alarms that are affecting the devices. In this manner, the alarm processing software 50 can be used by different types of people at the same time in different workstations to view different aspects of the alarms associated with the process control system 10. Furthermore, when using the alarm processing software 50, it is relatively easy for an individual to turn over alarm functions that they are viewing and acknowledging to another individual who may have the same software. Alternatively or additionally, an individual may set their filter to accept alarms that are normally viewed by another person. In this manner, one person may go to lunch and turn the alarm viewing function over to other persons at different workstations by resetting a few filter settings. When returning from lunch, that person may regain control of those functions. Also, when the amount of alarm information becomes too large for one person to handle, that person may hand off or shed the load for certain categories of alarms such as process alarms, device alarms or hardware alarms so that these alarms can be handled by other people at other terminals.

After the alarm processing unit 64 uses the filter 68 to decide which alarms (i.e., non-masked conditions) should be displayed to the user via the display 69 and the order in which the alarms should be displayed, the alarm processing unit 64 provides this information to a user display interface 70, which uses any standard or desired operating system to display alarm information on the alarm display 69 in any desired manner. Of course, the user display interface 70 obtains other information it needs, such as information about the layout of or the configuration of the process control system 10, the values of parameters or signals within that system, etc. from the database 66 or from other communication signals received from the process control system 10 via the communication layer 62. Also, the user display interface 70 receives commands from the user requesting, for example, more information related to particular alarms, changes to alarm or filter settings, new alarm displays, etc. and provides this information to the alarm processing unit 64, which then takes the requested action, searches the database 66 for the alarm information, etc. to provide a new alarm view to the user via the display 69.

Generally speaking, there are different categories of alarms that can be generated and displayed on the display 69 including, for example, process alarms, device alarms and hardware alarms. Process alarms, which are known and which are typically generated by function blocks or modules within a process control routine running on a controller or a field device, have, in the past, been sent to and displayed on an operator interface. Process alarms generally indicate a problem with the functional operation of the process control software, i.e., a problem with the process control routine itself such as out-of-bounds measurement, abnormal variances between process parameters and set points, etc. Process alarms are typically configured by the user as components of process control modules and may appear in the configuration information provided on the operator interface as being associated with a module name. Some types of process alarms include bad input/output, out-of-bounds measurements, exceeded thresholds, etc. Because process alarms are well known in the art, they will not be described in more detail herein.

Device alarms such as the alarms associated with the device failure, device maintenance and/or an advisable action, are alarms associated with the operation of the field devices within the process and may be detected by software (e.g., the software 53 in FIG. 1) within the field devices or other devices connected within the process control system 10 to indicate a problem or error with the operation of a field device. Device alarms may appear in the operator interface of the system described herein as being associated with a particular device. Device alarms may, for example, indicate that the pressure in a valve is to great or to small for proper operation of the valve, that the motor current in the valve is to high or to low, that the voltage levels of a device are not synchronized, that a valve plug within a valve is stuck, that the device is not communicating properly, that the device needs scheduled maintenance because, for example, a certain amount of time has passed or because a valve member of the device has undergone a certain amount of travel since the last maintenance, etc. Device alarms can be generated in any desired manner, including using proprietary or non-proprietary software located on a device itself or in other devices connected to the device for which the alarm is being generated to recognize and detect specific problems with the device and to generate an alarm with respect thereto.

As discussed above, there can be many different types of device alarms including, for example, failure alarms indicating that a failed or failing condition exists within a device, maintenance alarms indicating that maintenance of some type should take place, communication alarms indicating that a device is not communicating properly or at all, advisory alarms, etc. A failure (e.g., a "failed") alarm indicates that a device has detected one or more conditions indicating that it cannot perform a critical function and, thus, requires maintenance immediately. Whenever the failed alarm condition is true, the integrity of the device is considered bad, which rolls up to the controller and causes the integrity of the controller node to which the device is connected to be bad. On the other hand, a maintenance alarm indicates that a device is able to perform critical functions but has one or more detected conditions that may lead to a failure if left unaddressed and, thus, the device should receive maintenance attention soon. A communication (e.g., a "not communicating") alarm becomes active when a device stops communicating. Whenever the not communicating alarm condition is true, the integrity of the device is considered bad, which causes the integrity of the controller node to which the device is connected to be bad. An advisory alarm indicates that a device has detected conditions that do not fall into the other alarm categories. Usually, an advisory alarm is an alarm provided by individual devices and is uniquely associated with the type of device, such as a flow meter tracking the variability of the flow signal. In this case, the device may recognize that a variability in some signal associated with the device is too high or too low, which means that something unusual has happened and requires investigation. Depending on the device, advisory alarms may require more or less urgent attention than maintenance alarms and, thus, users may set the priority of the advisory alarm lower than that of the maintenance alarm. Of course, failed, maintenance and advisory alarms may not be supported by every device and a single, catch all alarm, such as an "abnormal" alarm for generic devices may be used instead of the failed, maintenance, and advisory alarms resulting in two total alarms, i.e., not communicating and abnormal. Of course, other types of device alarms could be created or used instead of or in addition to the ones discussed above.

In one embodiment, integrated alarm information may be provided to a user on a display in the form of an alarm banner at, for example, an edge of a display screen. Referring now to FIG. 3, an alarm banner 73 is located on the bottom of a screen 71. The alarm banner 73 includes a first line that displays indications of various alarms that have been generated by the process control system 10 and that have passed through the filter 68 to the display 69. At least one of the alarms indicated in the alarm banner 73 may be associated with the portion of the process control system 10 depicted in the main part of the screen 71. The specific alarms displayed in the alarm banner 73 and the order of these alarms are determined according to the configuration of the mask and priority parameters and the filter settings of the filter 68. Generally speaking, the highest priority alarms that have not been acknowledged, suppressed or masked will be displayed first, with the next highest priority arms being displayed next, and so on. In the exemplary screen of FIG. 3, the highest priority alarm 74 is a process alarm illustrated as being associated with a PID101 control routine. The alarm 74 is displayed in red to illustrate that its priority is critical. On the second line of the alarm banner 73, an alarm information field 76 displays alarm information associated with the alarm in the alarm banner 73 that is currently selected. In the example of FIG. 3, wherein the alarm 74 is selected, the alarm information field 76 illustrates that the alarm 74 was generated on Friday at 12:52:19, is associated with the "tank 16 level control," has a designation or name of PID101/HI_HI_ALM, has a high, high priority and is a critical alarm. If the alarm 74 is flashing, the alarm 74 has not been acknowledged, while a constant (non-flashing) alarm indication in the alarm banner 73 indicates that the alarm 74 has been acknowledged by some operator or user. Of course, other types of alarm information could be displayed within the alarm information field 76.

Also, the other alarm indications in the alarm banner 73, such as the alarm indication 78, may be yellow, purple, or any other color to indicate other levels of seriousness or priority associated with the alarm. When another alarm is selected, such as the alarm 78, 80, 81 or 82, alarm information pertaining to that alarm may be displayed in the alarm information field 76. When viewing an alarm in the alarm banner 73, the user can acknowledge the alarms and alert maintenance or engineer personnel to take the appropriate actions to correct the condition that led to the alarm or, alternatively, could take other steps such as resetting certain set points to alleviate the alarm condition.

As indicated above, by selecting one of the alarms in the alarm banner 73 such as the alarm 74, a primary control display for that alarm is presented in the screen 71. In particular, as shown in FIG. 3, the main body of the screen 71 includes a primary control display or depiction of pertinent hardware associated with a particular alarm (a selected alarm) within the process control system 10. In the example of FIG. 3, the hardware includes three tanks with various sensors attached thereto, all of which are interconnected by various valves and fluid flow lines. This hardware depiction is a representation of the equipment within a portion of the process control system 10 and provides information about the operation of some of the equipment, such as values or parameters associated with the tanks, sensors etc. Of course, some of this information may be provided by configuration information in the database 66 and signals from the sensors in the process control system via the controllers 12 and Ethernet connection 40. In this case, such information is sent through the communication layer 62 and is provided to the user display interface 70 via any known or desired software.

Figure 4:
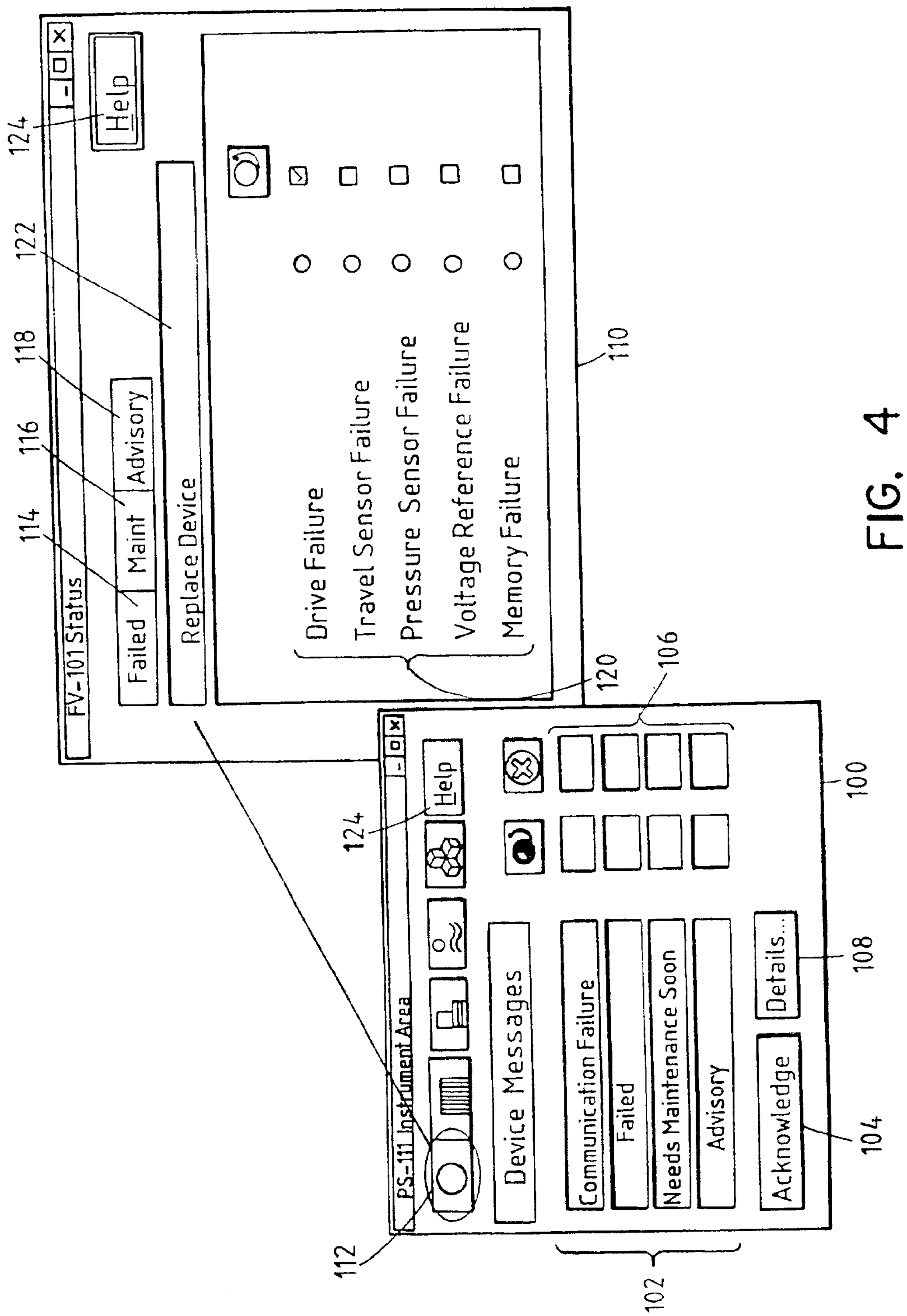
FIG. 4 is another exemplary user interface screen that may be generated by the alarm display and interface system used in the process control system of FIG. 1.
Figure 5:
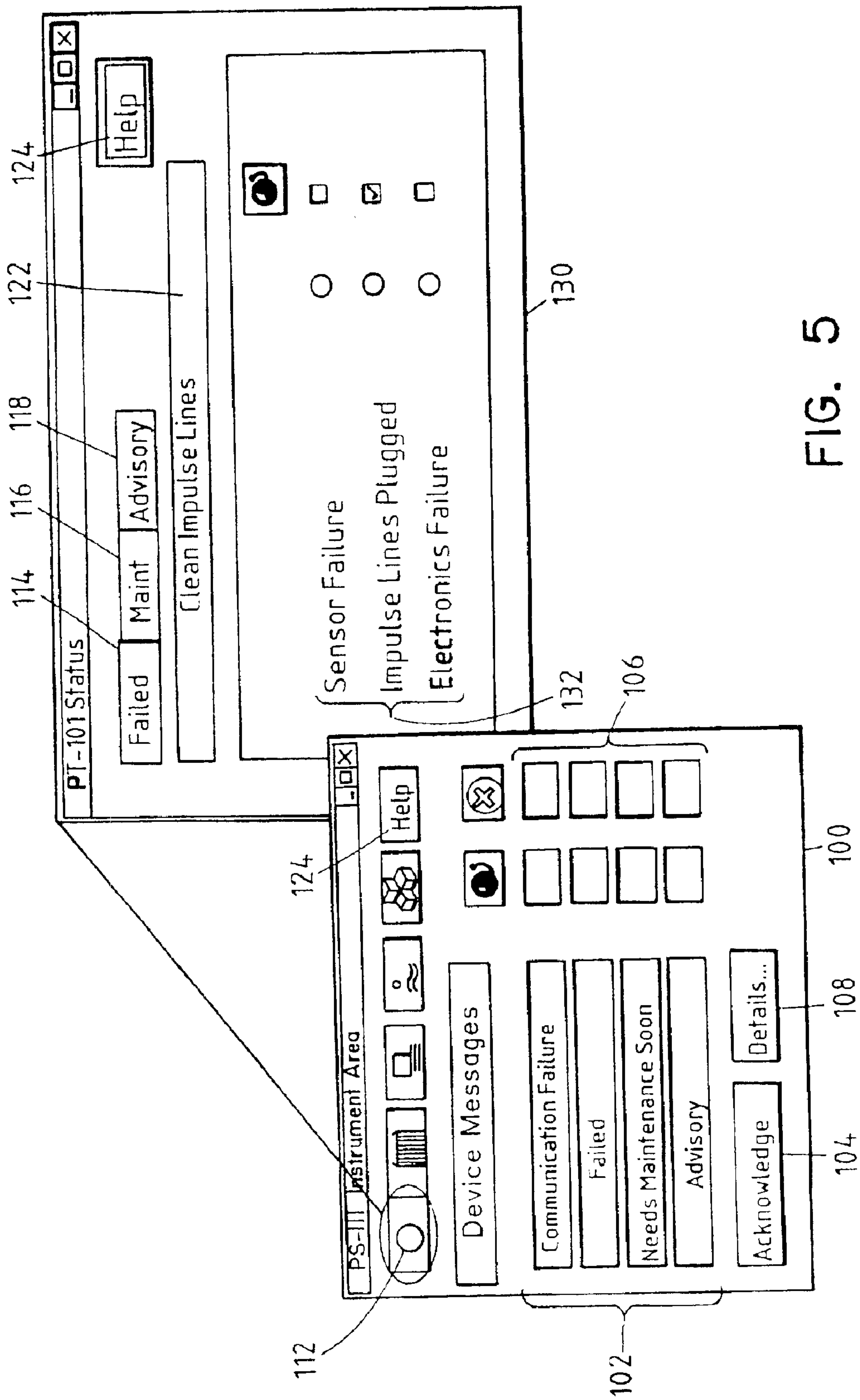
FIG. 5 is yet another exemplary user interface screen that may be generated by the alarm display and interface system used in the process control system of FIG. 1.
Figure 6:
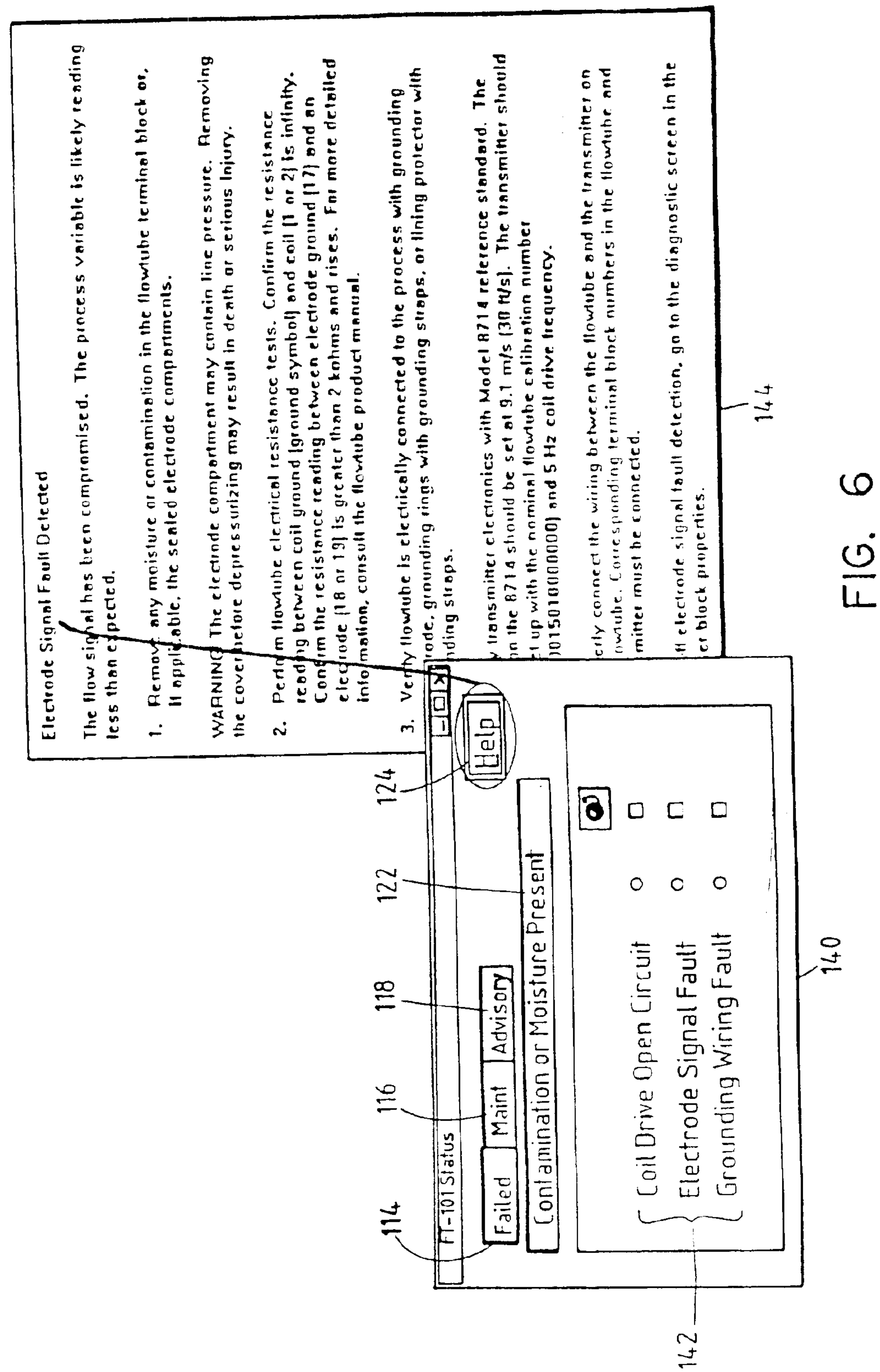
FIG. 6 is still another exemplary user interface screen that may be generated by the alarm display and interface system used in the process control system of FIG. 1.

FIGS. 4–6 are exemplary depictions of graphical displays that may be provided for use by a system user or operator via the alarm display and interface software 50. FIG. 4 depicts an exemplary pop up window 100 that may be displayed by the alarm processing software 50 in response to the system user or operator selecting one of the alarms from the alarm banner 73 shown in FIG. 3. In particular, if the user selects (e.g., by double clicking on) the alarm 80 associated with a flow valve FV 101, the pop up window 100 may be displayed. As shown in FIG. 4, the pop up window 100 includes alarm or alert bars 102, one or more of which may be highlighted to indicate an active condition within one or more of the independently reportable alarm parameters (i.e., FAILED_ALM, MAINT_ALM and ADVISE_ALM) for one or more of the Fieldbus devices 32–39, which in this example is the flow valve FV 101. Additionally, one or more of the alert bars may indicate an active condition associated with a device failure, maintenance or advisory alert or alarm from one or more of the HART devices 28–31. Of course, the "Failed" alarm bar may be highlighted as a result of an active condition within the FAILED_ALM parameter, the "Needs Maintenance Soon" bar may be highlighted as a result of an active condition within the "MAINT_ALM" parameter and the "Advisory" bar may be highlighted as a result of an active condition within the "ADVISE_ALM." Additionally, as shown in FIG. 4, the alarm or alert bars 102 may include a "Communication Failure" bar to indicate the presence of a communication failure within any one of the field devices 25–39.

The system user or operator may select an acknowledge button 104 to acknowledge a highlighted alarm or alert within the window 100 or, alternatively, may select one of the cancel boxes 106 to cancel one or more active alarms or alerts. Further, if desired, the user or system operator may select a "Details" button 108 to invoke other pop up windows, as discussed in greater detail below, that provide additional information related to those alarms that are currently active within the window 100.

FIG. 4 also depicts another pop up window 110 including more detailed status information associated with the flow valve FV 101. The status window 110 may be invoked from the window 100 by selecting an icon 112, the details button 108, a highlighted one of the alarm or alert bars 106, or in any other desired manner. In any event, the status window 110 may include bars 114, 116 and 118, each of which corresponds to one of the independently reportable alarms or alerts. In this example, the "Failed" bar is highlighted because the flow valve FV 101 currently has an active condition within a FAILED_ALM parameter of the valve FV 101. The status window 110 also includes a list of possible conditions 120 associated with the reporting of a failure within the flow valve FV 101. It is important to recognize that while only five conditions are shown in this example more or fewer than five conditions may be provided if desired. Each of the possible conditions 120 shown within window 110 corresponds uniquely to the unmasked active conditions that may be reported by the FAILED_ALM or device failure parameter for that device. Still further, the window 110 provides a recommended action bar 122, which displays the textual information that is associated with the RECOMMENDED_ACTION parameter of the device and which may be stored within the device description of the device. Additionally, the window 110 includes a help button 124 which, if selected by the system user or operator, may invoke another pop up window (such as the help window 144 shown in FIG. 6 and discussed below) containing textual information for facilitating the user or system operator in troubleshooting, repairing, etc. the device that generated the alarm or alert currently being viewed.

FIG. 5 is another exemplary depiction of a pop up window 130 that provides status information associated with a pressure transmitter PT 101. The general format of the window 130 shown in FIG. 5 is identical to that shown FIG. 4 except that the window 130 includes possible conditions 132, which are conditions that may cause the pressure transmitter PT 101 to generate a maintenance alert or alarm. It should be noted that, in this example, the maintenance button 116 is highlighted or active, which indicates that a non-masked condition associated with the MAINT_ALM or device needs maintenance parameter for the pressure transmitter PT 101 is currently active.

FIG. 6 is yet another exemplary depiction of a pop up window 140 that provides status information associated with a flow transmitter FT 101 and which includes a group of possible conditions 142 that are similar or identical to the conditions that may be reported by the MAINT_ALM or device needs maintenance parameters for the flow transmitter FT 101. FIG. 6 also shows the pop up help window 144 that may be invoked by selecting the help button 124. As shown in FIG. 6, the help window 144 includes detailed textual information, which may be provided by the device description of the flow transmitter FT 101 and sent to the workstation 14 for display via the alarm display software 50.

While the alarm display and interface software 50 has been described as being used in conjunction with Fieldbus, HART and standard 4–20 mA devices, it can be implemented using any other external process control communication protocol and may be used with any other types of controller software. Although the alarm display and interface software 50 described herein is preferably implemented as software, it may be implemented in hardware, firmware, etc., and may be implemented by any other processor associated with the process control system 10. Thus, the routine 50 described herein may be implemented in a standard multi-purpose processor or using specifically designed hardware or firmware as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Of course, while the independently reportable alarms described herein have been described as having three levels of severity or types of alarm (i.e., device failure, device maintenance and an advisable action), it should be recognized that two levels or more than three levels of severity may be used instead without departing from the scope and the spirit of the invention.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of generating a HART alert message within a process control system, comprising the steps of:

uniquely associating a plurality of device conditions for a HART device with a plurality of device status conditions, each of which is indicative of a different level of severity;

detecting a condition associated with the HART device;

mapping the condition associated with the HART device to one of the plurality of device status conditions; and generating the HART alert message to include information associated with the condition associated with the HART device and the one of the plurality of device status conditions;

wherein the step of uniquely associating the plurality of device conditions for the HART device with the plurality of device status conditions includes the step of uniquely associating the plurality of device conditions for the HART device with one of a status condition associated with a failure of the HART device, a status condition associated with maintenance of the HART device and a status condition associated with an advisable action in connection with the HART device.

2. The method of claim 1, wherein the step of detecting the condition associated with the HART device includes the step of detecting one of a condition associated with a failure of the HART device, a condition associated with maintenance of the HART device and a condition associated with an advisable action in connection with the HART device.

3. The method of claim 1, wherein the step of mapping the condition associated with the HART device to the one of the plurality of device status conditions includes the step of using a table that uniquely maps standard HART status conditions to at least two status conditions selected from the group consisting of failure, maintenance and advisable action status conditions.

4. The method of claim 3, further including the step of using the table to map a device specific condition to one of a failure status condition, a maintenance status condition and advisable action status condition.

5. The method of claim 1, wherein the step of mapping the condition associated with the HART device to the one of the plurality of device status conditions includes the step of associating a more status available condition with an advisable action status condition.

6. The method of claim 1, further including the step of displaying the detected condition together with an indication of the one of the plurality of device status conditions.

7. A system for use in a process control system having a processor that generates a HART alert message, the system comprising:

a computer readable medium;

a first routine stored on the computer readable medium and adapted to be executed by the processor that uniquely associates a plurality of device conditions for a HART device with a plurality of device status conditions, each of which is indicative of a different level of severity;

a second routine stored on the computer readable medium and adapted to be executed by the processor that detects a condition associated with the HART device;

a third routine stored on the computer readable medium and adapted to be executed by the processor that maps the condition associated with the HART device to one of the plurality of device status conditions; and a fourth routine stored on the computer readable medium and adapted to be executed by the processor that generates the HART alert message to include information associated with the condition associated with the HART device and the one of the plurality of device status conditions;

wherein the first routine is further adapted to uniquely associate the plurality of device conditions for the HART device with one of a status condition associated with a failure of the HART device, a status condition associated with maintenance of the HART device and a status condition associated with an advisable action in connection with the HART device.

8. The system of claim 7, wherein the second routine is further adapted to detect one of a condition associated with a failure of the HART device, a condition associated with maintenance of the HART device and a condition associated with an advisable action in connection with the HART device.

9. The system of claim 7, wherein the third routine is further adapted to use a table that uniquely maps standard HART status conditions to at least two status conditions selected from the group consisting of failure, maintenance and advisable action status conditions.

10. The system of claim 9, wherein the third routine is further adapted to use the table to map a device specific condition to one of a failure status condition, a maintenance status condition and advisable action status condition.

11. The system of claim 7, wherein the third routine is further adapted to associate a more status available condition with an advisable action status condition.

12. A method of reporting field device alert messages within a process control system having a user interface display, comprising the steps of:

detecting a condition within a field device;

associating the detected condition with one of a device failure, device maintenance and advisable action status conditions, each of which is indicative of a different level of severity; and reporting the detected condition via the user interface display using the one of the device failure, device maintenance and advisable action status conditions.

13. The method of claim 12, wherein the step of detecting the condition within the field device includes the step of detecting the condition within one of a Fieldbus and HART device.

14. The method of claim 12, wherein the step of associating the detected condition with the one of the device failure, device maintenance and advisable action status conditions includes the step of using a table to map the detected condition to the one of the device failure, device maintenance and advisable action status conditions.

15. The method of claim 14, wherein the step of using the table to map the detected condition to the one of the device failure, device maintenance and advisable action status conditions includes the step of using a table stored within one of the device and a computer communicatively coupled to the process control system.

16. A method of generating alert messages within a process control system, the method comprising:

associating each device status condition in a first plurality of possible device status conditions with a corresponding one device status condition in a second plurality of possible device status conditions, the first plurality of possible device status conditions comprising standard HART device status conditions, the second plurality of possible device status conditions comprising at least a failed device condition, a device needs maintenance condition, and an advisory condition;

receiving device status data from a HART device within the process control system, the device status data indicative of a HART device status condition associated with the HART device, the HART device status condition comprising one device status condition from the first plurality of possible device status conditions;

determining a device status condition from the second plurality of possible device status conditions associated with the HART device status condition; and generating a HART alert message, the HART alert message including data indicative of the HART device, data indicative of the HART device status condition, and data indicative of the device status condition from the second plurality of possible device status conditions associated with the HART device status condition.

17. The method of claim 16, wherein generating the HART alert message comprises generating the HART alert message in a Fieldbus alert message format.

18. The method of claim 16, wherein associating each device status condition in the first plurality of possible device status conditions with the corresponding one device status condition in the second plurality of possible device status conditions comprises:

associating a device malfunction condition with the failed device condition;

associating a more status available condition with the advisory condition;

associating a configuration change condition with the advisory condition;

associating a PV saturated condition with the device needs maintenance condition;

associating a PV fixed condition with the device needs maintenance condition;

associating a PV out of limits condition with the device needs maintenance condition;

associating a non-PV out of limits condition with the device needs maintenance condition; and associating a cold start condition with the advisory condition.

* * * * *

UNITED STATES PATENT AND TRADEMARK OFFICE

CERTIFICATE OF CORRECTION

PATENT NO. : 6,975,219 B2 Page 1 of 1
APPLICATION NO. : 09/896967
DATED : December 13, 2005
INVENTOR(S) : Evren Eryurek et al.

It is certified that error appears in the above-identified patent and that said Letters Patent is hereby corrected as shown below:

<u>On the First Page:</u>
At line (56), Other Publications, 2nd Reference, “Diagnositcs” should be -- Diagnostics --.

<u>On Page Three:</u>
At line (56), Other Publications, please add -- International Search Report for PCT/US02/15901, issued June 17, 2003 --.

At line (56), Other Publications, 15th Reference on p. 3, “PCt” should be -- PCT --.

At line (56), Other Publications, 20th Reference on p. 3, “Wemwe” should be -- Wernwe --.

<u>In the Specification:</u>
At Column 5, line 19, “includes” should be -- include --.

At Column 15, lines 2-3, “ADVISE-ALM” should be --ADVISE_ALM --.

At Column 16, line 21, “to great or to small” should be -- too great or too small --.

At Column 16, line 23, “to high or to low” should be -- too high or too low --.

At Column 17, line 27, “arms” should be -- alarms --.

Signed and Sealed this

Third Day of April, 2007

JON W. DUDAS
*Director of the United States Patent and Trademark Office*